(12) United States Patent
Narita

(10) Patent No.: US 8,237,678 B2
(45) Date of Patent: Aug. 7, 2012

(54) APPARATUS AND METHOD FOR DETECTING CONTACT ON OR PROXIMITY TO A TOUCH SCREEN

(75) Inventor: Tomoya Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 12/550,103

(22) Filed: Aug. 28, 2009

(65) Prior Publication Data

US 2010/0053109 A1   Mar. 4, 2010

(30) Foreign Application Priority Data

Aug. 29, 2008  (JP) ............................... P2008-221856

(51) Int. Cl.
*G06F 3/041* (2006.01)
(52) U.S. Cl. ........................................................ 345/173
(58) Field of Classification Search .................. None
See application file for complete search history.

(56) References Cited

U.S. PATENT DOCUMENTS

| 2007/0097096 | A1 | 5/2007 | Rosenberg | |
|---|---|---|---|---|
| 2007/0300182 | A1 | 12/2007 | Bilow | |
| 2008/0231607 | A1* | 9/2008 | Utsunomiya et al. | 345/173 |
| 2010/0020037 | A1* | 1/2010 | Narita et al. | 345/173 |

FOREIGN PATENT DOCUMENTS

| JP | 11-24839 | 1/1999 |
|---|---|---|
| JP | 2005-234958 | 9/2005 |
| JP | 2006-276223 | 10/2006 |
| JP | 2007-11228 | 1/2007 |
| JP | 2008-27292 | 2/2008 |
| JP | 2008-97172 | 4/2008 |
| JP | 2008-146165 | 6/2008 |
| JP | 2008-234594 | 10/2008 |
| WO | WO 2005/114369 A2 | 12/2005 |

OTHER PUBLICATIONS

European Search Report from the European Patent Office in European Application No. 09251558, (Jul. 1, 2010).

* cited by examiner

*Primary Examiner* — Hoa T Nguyen
*Assistant Examiner* — Mark Fischer
(74) *Attorney, Agent, or Firm* — Finnegan, Henderson, Farabow, Garrett & Dunner, L.L.P.

(57) ABSTRACT

To provide an information processing apparatus and information processing method capable of correcting a contact or proximity position to be closer to a user-intended contact or proximity position with high accuracy. It includes a calculation unit 163 that 3-value processes the proximity value to detect a first region and a second region depending on the 3-value processed proximity value and then calculates positions of respective centroids of the first region and the second region to calculate a direction of a straight line connecting the respective centroids, a calculation unit 162 calculating a contact or proximity position between the operation object and the surface of the display unit based on the proximity value, and a calculation unit 165 calculating a pointed position different from the contact or proximity position based on the contact or proximity position and the direction of the straight line connecting the first centroid and the second centroid.

12 Claims, 9 Drawing Sheets

APPARATUS AND METHOD FOR DETECTING CONTACT ON OR PROXIMITY TO A TOUCH SCREEN

BACKGROUND OF THE INVENTION

1. Field of the Invention

The present invention relates to an information processing apparatus and information processing method.

2. Description of Related Art

A display device includes a touch panel (touch screen) in which an electrostatic capacitance or resistive touch sensor is provided on a surface of a display unit such as liquid crystal display. With the touch panel, the user can touch the screen of the display unit to input information into the information processing apparatus so that the user can easily manipulate the information processing apparatus.

A touch panel technique other than electrostatic capacitance or resistive type is disclosed as a display device for detecting an operation near the display unit. For example, Japanese Patent Application Laid-Open No. 2006-276223 discloses a technique in which a display device simultaneously performs light emission and light reception. Further, Japanese Patent Application Laid-Open No. 11-24839 (U.S. Pat. No. 3,968,477) discloses a technique for operating a computer device in response to an operation of operator's hand or human body. Furthermore, Japanese Patent Application Laid-Open No. 2008-146165 discloses a panel technique capable of outputting information on several points with respect to input points on the panel.

SUMMARY OF THE INVENTION

In related art, a contact or proximity to a touch panel is detected as a region occupying a certain area on the touch panel. Thus, in order to calculate a representative point of the contact or proximity on the touch panel, the centroid of the contact region or proximity region having a certain area is calculated to determine the calculated centroid position as the representative point of the contact or proximity.

However, there has been an issue that the point which is determined as being contacted on or proximate to the touch panel based on the centroid of the region is different from a point which a user intends to contact or be proximate to. For example, when a plurality of user-selectable buttons are adjacently displayed on a screen of the touch panel, a different button from a user-intended button may be selected due to how to hold the touch panel or a length of a user's nail.

In order to avoid the above issues, in consideration of how to hold the touch panel or use's usage, it may be possible to assume user's intension to a certain degree and to calculate a different point from an actually-detected contact point or proximity point as a user-intended point depending on a detection position on the screen. However, the touch panel can be variously utilized such as vertically, horizontally, upside down. Thus, it was difficult to previously assume how to hold the touch panel or its usage and to correct the contact point or proximity point based on the assumption.

The present invention has been made in view of the above issues, and it is desirable to provide a novel and improved information processing apparatus and information processing method capable of correcting a contact position or proximity position not to a detected contact position or proximity position but to a user-intended contact position or proximity position with high accuracy.

According to an embodiment of the present invention, there is provided an information processing apparatus including: a display unit that displays an image on a screen based on image data; a proximity value obtaining unit that obtains a proximity value of a contact or proximity between an operation object and a surface of the display unit; a region detection unit that 3-value processes the proximity value and detects a first region and a second region different from the first region depending on the 3-value processed proximity value; a centroid position calculation unit that calculates positions of respective centroids of the first region and the second region; a linear direction calculation unit that calculates a direction of a straight line connecting a first centroid as the centroid of the first region and a second centroid as the centroid of the second region; a position calculation unit that calculates a contact position or proximity position between the operation object and the surface of the display unit based on the proximity value; and a pointed position calculation unit that calculates a pointed position different from the contact position or the proximity position based on the contact position or the proximity position and the direction of the straight line connecting the first centroid and the second centroid.

The position calculation unit may calculate the first centroid as the contact position or the proximity position, and the pointed position calculation unit may calculate a position on the straight line to which the contact position or the proximity position is moved by the amount of offset as the pointed position.

The information processing apparatus may include an offset amount calculation unit that calculates the amount of offset based on a distance between the first centroid and the second centroid.

The proximity value obtaining unit may include a light reception unit that receives a light incident into the surface of the display unit from outside and converts the received light into an electric signal, and a luminance value calculation unit that calculates a luminance value for each pixel as the proximity value from the electric signal.

The proximity value obtaining unit may include an electrostatic capacitance detection unit that detects an electrostatic capacitance between the operation object and the surface of the display unit, and a proximity value calculation unit that calculates a change in the electrostatic capacitance as the proximity value.

Furthermore, according to another embodiment of the present invention, there is provided an information processing method including the steps of: displaying an image on a screen based on image data by display unit; obtaining a proximity value of a contact or proximity between an operation object and a surface of the display unit by proximity value obtaining unit; 3-value processing the proximity value and detecting a first region and a second region different from the first region depending on the 3-value processed proximity value by region detection unit; calculating positions of respective centroids of the first region and the second region by centroid position calculation unit; calculating a direction of a straight line connecting a first centroid as the centroid of the first region and a second centroid as the centroid of the second region by linear direction calculation unit; calculating a contact position or proximity position between the operation object and the surface of the display unit based on the proximity value by position calculation unit; and calculating a pointed position different from the contact position or the proximity position based on the contact position or the proximity position and the direction of the straight line connecting the first centroid and the second centroid by pointed position calculation unit.

According to the embodiments of the present invention, a contact position or proximity position can be corrected to be closer not to a detected contact position or proximity position but to a user-intended contact position or proximity position with high accuracy.

BRIEF DESCRIPTION OF THE DRAWINGS

FIG. 9A shows a distribution of the luminance values on the line A-A and FIG. 9B shows a distribution of the luminance values on the line B-B.

DETAILED DESCRIPTION OF PREFERRED EMBODIMENTS

Figure 1:
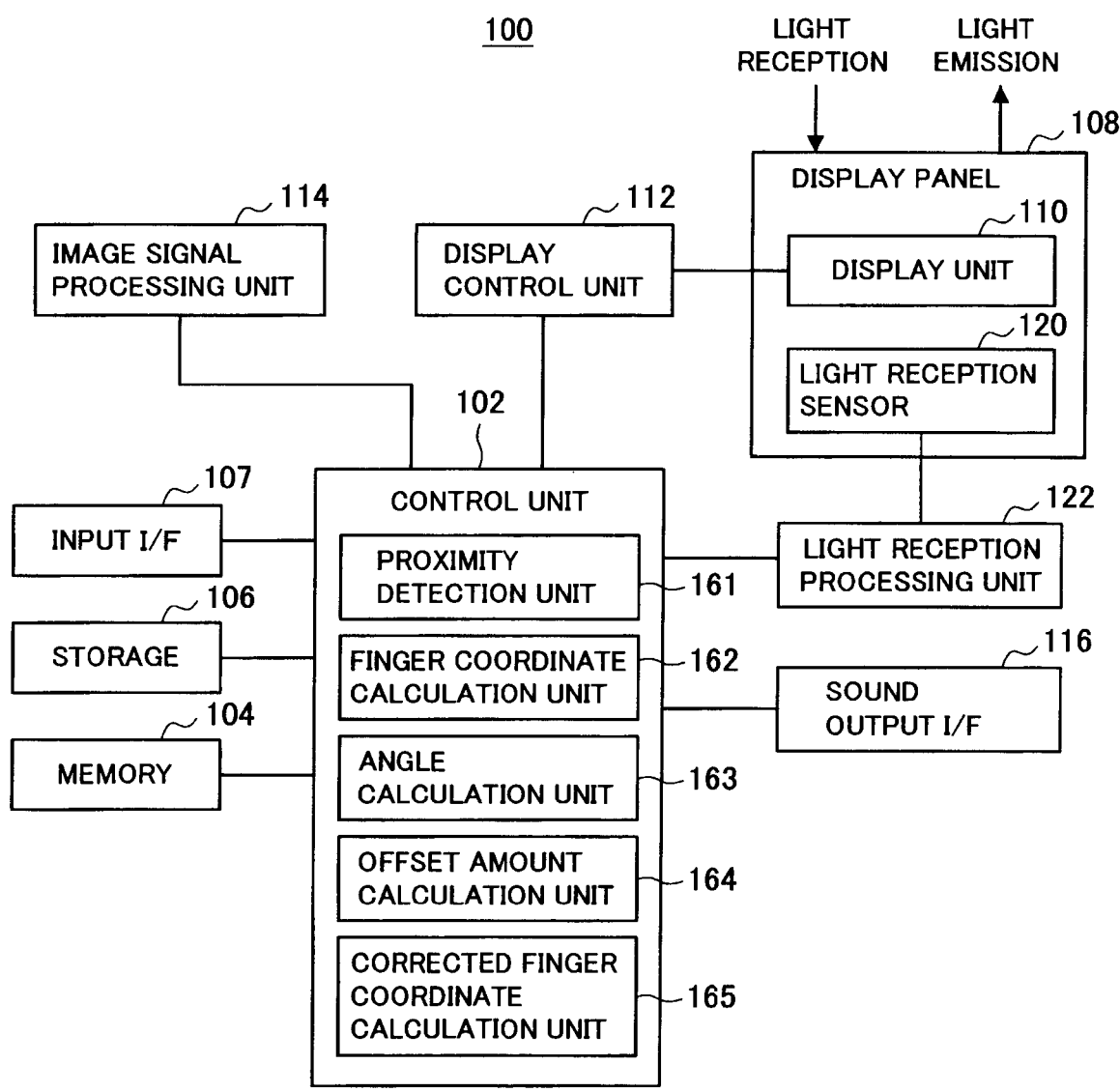
FIG. 1 is a block diagram showing an information processing apparatus according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Structure of one embodiment
2. Operation of one embodiment

<1. Structure of One Embodiment>

At first, an information processing apparatus 100 according to one embodiment of the present invention will be described. FIG. 1 is a block diagram showing the information processing apparatus 100 according to the present embodiment.

The information processing apparatus 100 according to the present embodiment includes a control unit 102, a memory 104, a storage 106, an input I/F 107, an image signal processing unit 114, a display panel 108, a display control unit 112, a speech output I/F 116, a light reception processing unit 122 and the like, for example. There will be described a case in which the display panel 108 is integrally provided in the information processing apparatus 100 in the present embodiment, but the present invention can be applied to a case in which the information processing apparatus 100 and the display panel 108 are separately provided.

The information processing apparatus 100 is a personal computer, audio player, media player, PDA (personal digital assistant), cell phone, digital camera or the like, for example.

The control unit 102 has a microcomputer which is configured in combination with a CPU (Central Processing Unit), a ROM (Read Only Memory), a RAM (Random Access Memory) and the like. The control unit 102 functions as a calculation processing device and a control device by programs, and controls the above respective constituents in the information processing apparatus 100. A signal is input into the control unit 102 from the touch panel 112 receiving an operation from outside.

The memory 104 is configured with a storage unit such as RAM, ROM or cache memory, and has a function of temporarily storing therein data relating to the processing of the CPU of the control unit 102 or operation programs of the CPU.

The storage 106 is, for example, a hard disk, optical disk, flash memory or the like, and is a storage unit for storing therein data for a long time. The storage 106 stores therein music data or video data such as videos or photographs, for example. The storage 106 stores therein the music data or the video data through a data reception control processing and accumulation control processing in the control unit 102.

The input I/F 107 is, for example, a USB terminal, IEEE 1394 terminal or the like, and is an interface which is connectable to an external device. Various items of information or instructions are input into the information processing apparatus 100 via the input I/F 107.

The image signal processing unit 114 performs a signal processing on an image signal generated in the light reception processing unit 122. The image signal processing unit 114 performs various required signal processings such as resolution conversion for converting an image signal into the number of pixels of the display unit 110, luminance correction, color correction and gamma correction.

The display panel 108 includes, for example, the display unit 110, the light reception sensor 120 and the like, and the light reception sensor 120 detects an operation object such as user's finger or hand to accept the user's operation. The display panel 108 according to the present embodiment does not need to contact the screen unlike the touch panel, and detects a proximity to the screen to accept the user's operation. Then, the display panel 108 selects an item displayed on the screen, scrolls the screen or changes a zoom-in or zoom-out display in response to the user's operation.

The display unit 110 is a liquid crystal display, for example, and is controlled by the display control unit 112. The display unit 110 displays various menu screens or images based on image data. The light reception sensor 120 is one example of a light reception unit, which receives a light incident into the display screen of the display unit 110 from outside to convert the received light into an electric signal. The light reception sensor 120 sends the generated electric signal to the light reception processing unit 122.

The speech output I/F 116 is, for example, a terminal for a phone plug or the like, and is connected to an external device such as headphone or speaker. The speech output I/F 116 outputs reproduced speech data to the external device.

Figure 2:
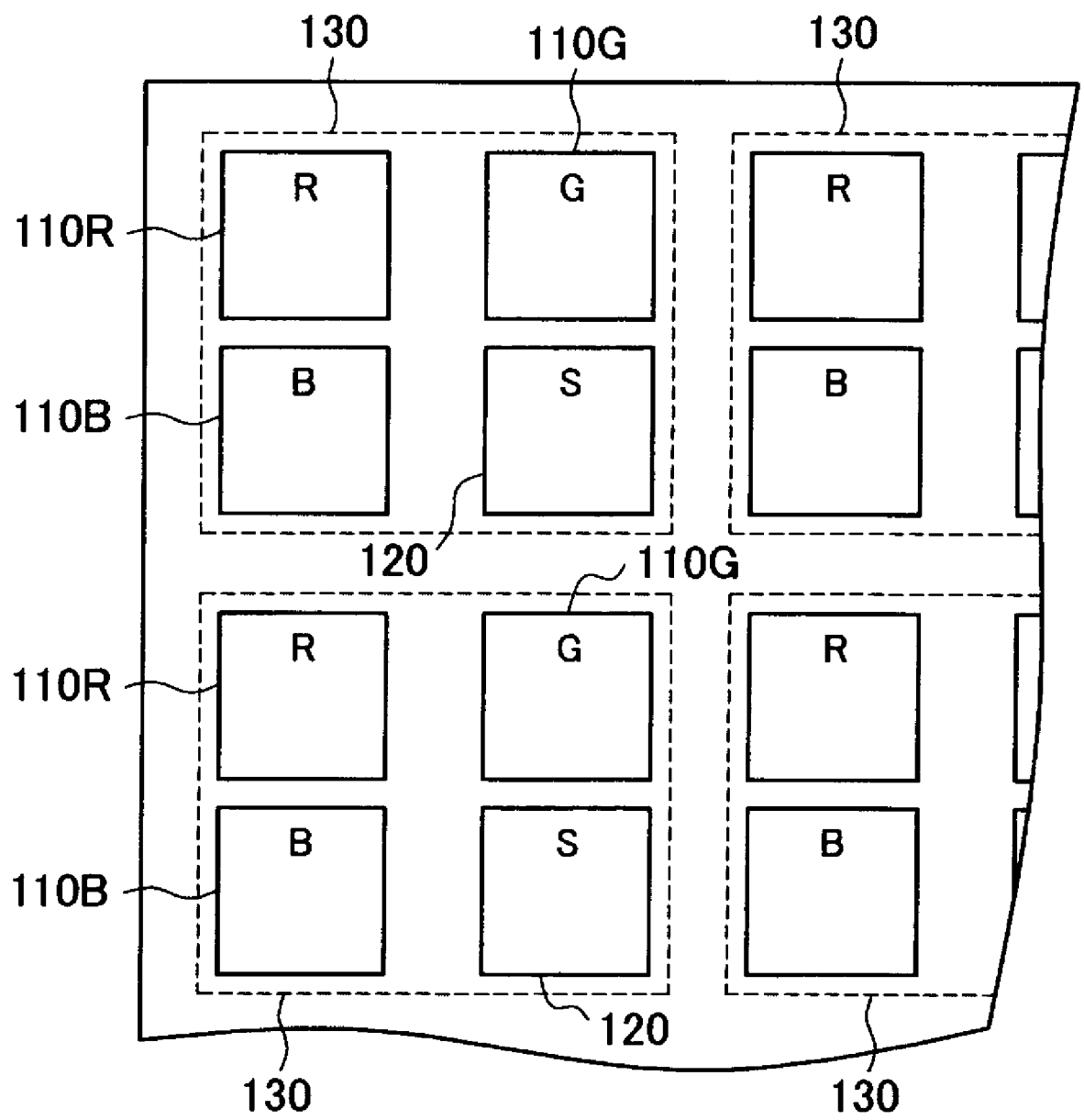
FIG. 2 is an explanatory diagram showing pixels of a display panel according to the embodiment.

FIG. 2 is an explanatory diagram showing pixels of the display panel 108 according to the present embodiment. A plurality of pixel sets 130 are arranged in the display panel 108 in a matrix manner. The pixel set 130 is provided with a red display pixel 110R, a green display pixel 110G, a blue display pixel 110B, which are light emitting elements, and a light reception sensor 120. The display pixels 110R, 110G, 110B and the light reception sensor 120 are adjacently arranged in one pixel set 130. The arrangement of pixels is not limited to the example shown in FIG. 2 and other arrangement may be employed.

When the operation object such as a user's finger or hand moves close to the display screen by the display panel 108 according to the present embodiment, the information processing apparatus 100 can detect the operation object.

The display control unit 112 utilizes an input image signal to drive the display unit 110. The display control unit 112 performs a display processing on the image signal received from the image signal processing unit 114. Further, the display control unit 112 combines the display data and generates user-viewable data in the display unit 110. The data generated in the display control unit 112 is output to the display unit 110.

The light reception processing unit 122 receives the electric signal from the light reception sensor 120 to perform A/D conversion processing or the like, and generates an image signal for each pixel. Thus, the image signal processing is enabled in the image signal processing unit 114 and various operations can be performed based on the image signal in the control unit 102.

The control unit 102 of the information processing apparatus 100 according to the present embodiment will be described below. The control unit 102 includes a proximity detection unit 161, a finger coordinate calculation unit 162, an angle calculation unit 163, an offset amount calculation unit 164, a corrected finger coordinate calculation unit 165 and the like.

The proximity detection unit 161 is one example of a proximity value obtaining unit, which calculates a luminance value for each pixel based on the image signal generated by the light reception processing unit 122 to calculate the luminance value as a proximity value. The proximity value calculated by the proximity detection unit 161 is a value of the contact or proximity between the operation object and the surface of the display panel 108.

The proximity detection unit 161 is one example of a region detection unit, which 3-value processes the luminance value to detect a first region and a second region different from the first region for the detected object depending on the 3-value processed luminance value. The proximity detection unit 161 is one example of a centroid position calculation unit, which calculates positions of the respective centroids of the first region and the second region.

The finger coordinate calculation unit 162 is one example of a position calculation unit, which calculates the first centroid calculated by the proximity detection unit 161 as the contact position or proximity position. The coordinate of the first centroid is assumed as a representative point at which the operation object contacts or is proximate to the surface of the display panel 108. The representative point of the contact or proximity positions to the surface of the display panel 108 is not limited to the first centroid and may be assumed as a middle point between one end of the first region and the other end thereof, for example.

The angle calculation unit 163 is one example of a linear direction calculation unit, which calculates a direction of a straight line connecting a first centroid as the centroid of the first region calculated in the proximity detection unit 161 and a second centroid as the centroid of the second region. The angle calculation unit 163 calculates an angle of the straight line connecting the first centroid and the second centroid relative to a downward (or upward) direction (vertical direction) on the screen, for example. The straight line connecting the first centroid and the second centroid corresponds to the direction of the finger 10.

The offset amount calculation unit 164 calculates the amount of offset based on the distance between the first centroid calculated in the proximity detection unit 161 and the second centroid, for example. For example, when the distance between the first centroid and the second centroid is longer, the user's finger is more horizontal to the display panel 108. On the other hand, when the distance between the first centroid and the second centroid is shorter, the user's finger is more vertical to the display panel 108. The offset amount calculation unit 164 uses the characteristics to calculate the amount of offset.

The offset amount calculation unit 164 may calculate the distance between one end of the first region at which the straight line connecting the first centroid and the second centroid crosses the boundary of the first region and the first centroid as the amount of offset.

The corrected finger coordinate calculation unit 165 is one example of a pointed position calculation unit, which calculates a pointed position different from the contact position or proximity position based on the contact position or proximity position calculated in the finger coordinate calculation unit 162 and the direction of the straight line connecting the first centroid and the second centroid calculated in the proximity detection unit 161. For example, the corrected finger coordinate calculation unit 165 calculates a position on the straight line to which the contact position or proximity position calculated in the finger coordinate calculation unit 162 is moved by the amount of offset as the pointed position. The amount of offset used by the corrected finger coordinate calculation unit 165 is the amount of offset calculated by the offset amount calculation unit 164. The pointed position is closer to the user-intended contact or proximity position as compared with the contact or proximity position calculated from the first centroid.

<2. Operation of One Embodiment>

An operation of the information processing apparatus 100 according to the present embodiment will be described below.

Figure 3:
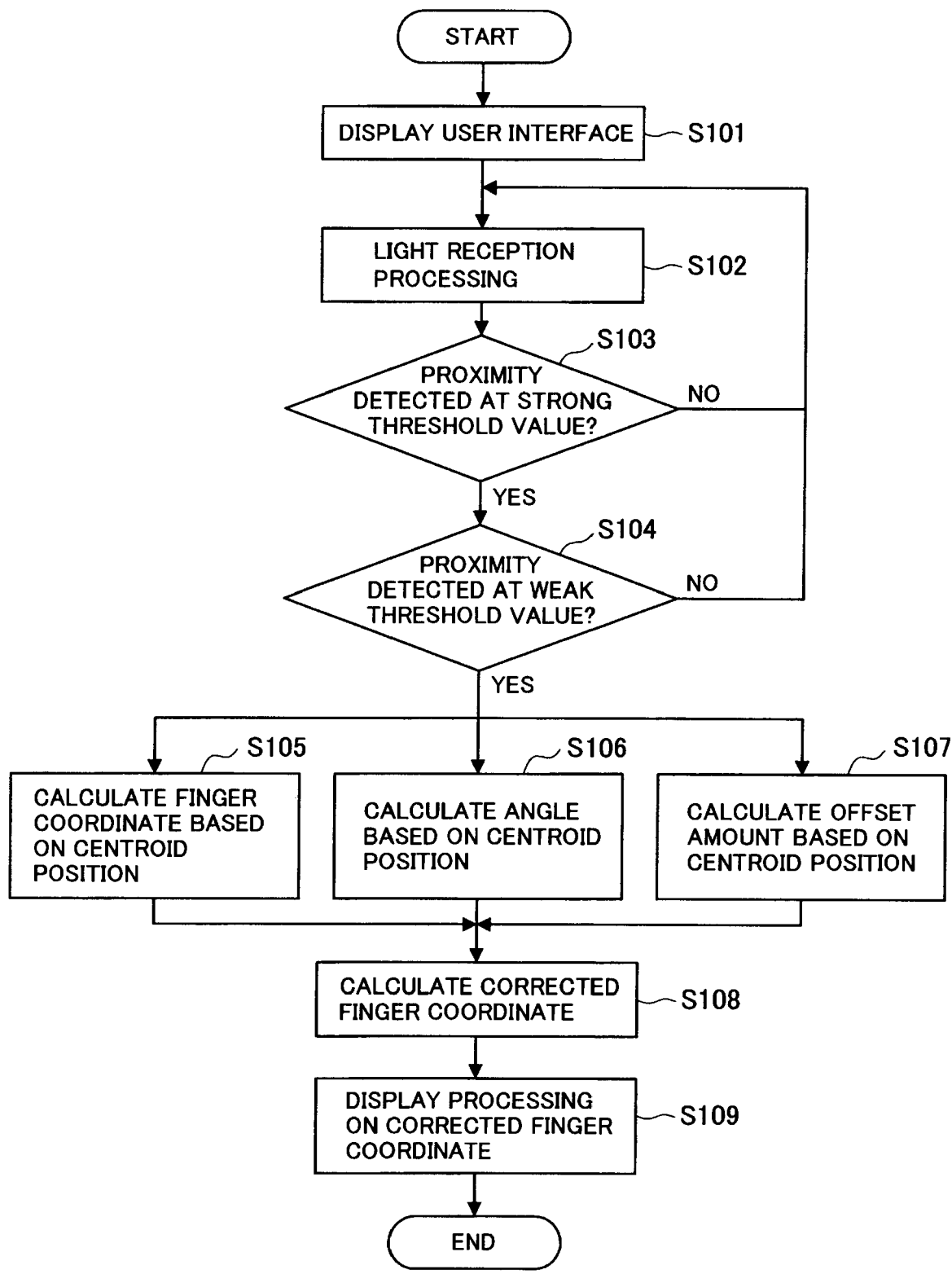
FIG. 3 is a flowchart showing an operation of the information processing apparatus according to the embodiment.
Figure 4:
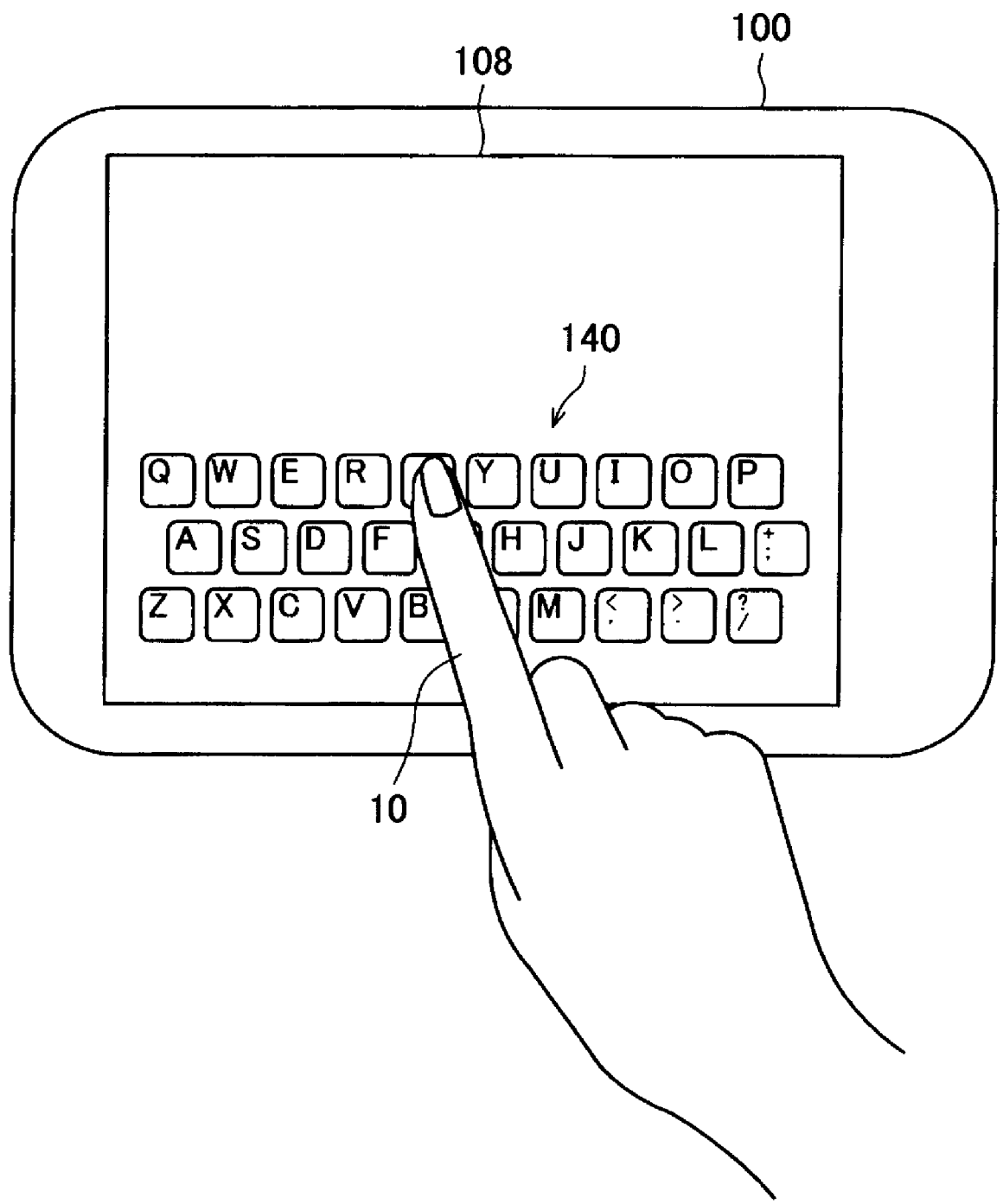
FIG. 4 is an explanatory diagram showing an image displayed on the display panel and a user's operation.
Figure 5:
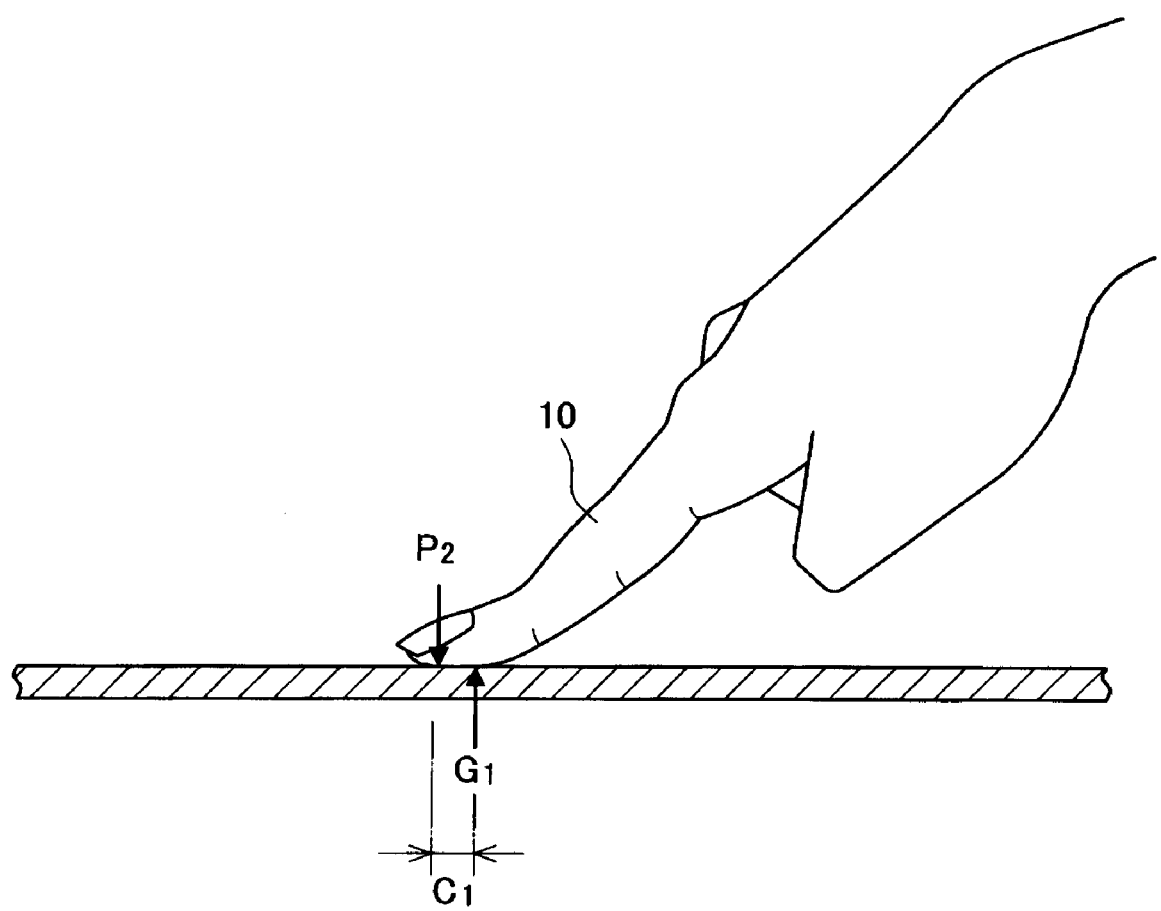
FIG. 5 is an explanatory diagram showing a relationship between the display panel and a user's finger.
Figure 6:
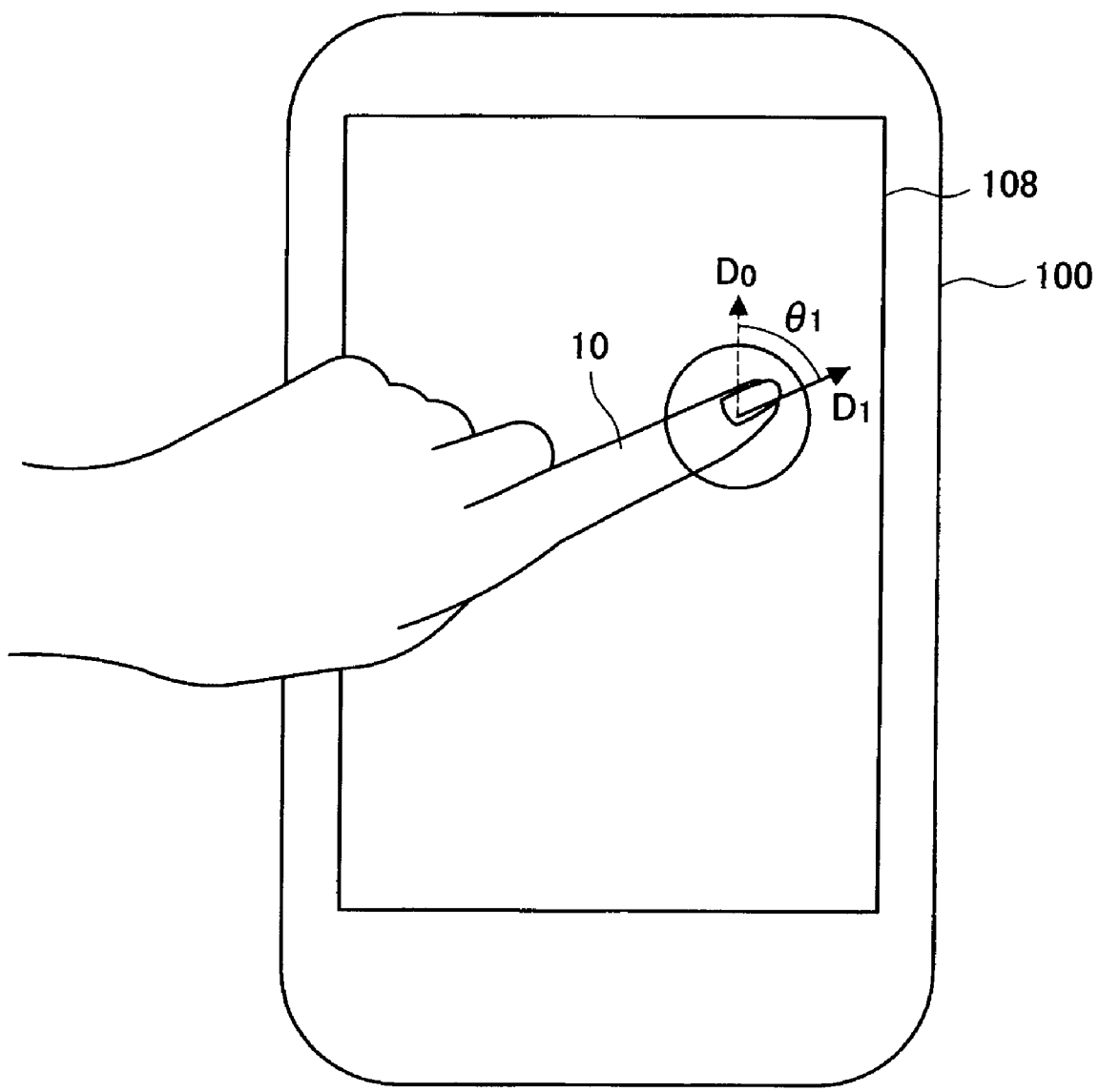
FIG. 6 is an explanatory diagram showing a relationship between the display panel and a user's finger.
Figure 7:
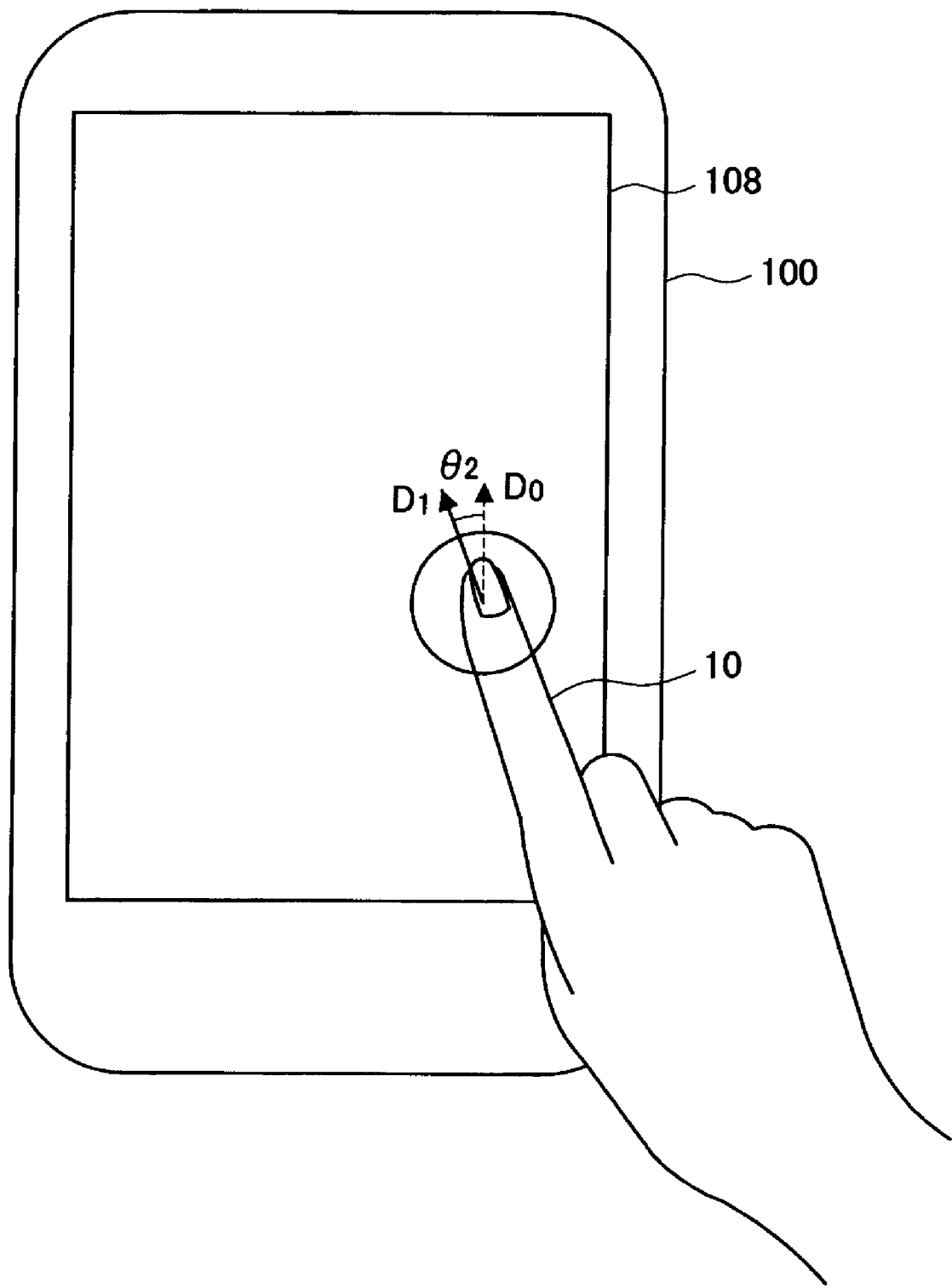
FIG. 7 is an explanatory diagram showing a relationship between the display panel and a user's finger.

FIG. 3 is a flowchart showing the operation of the information processing apparatus 100 according to the present embodiment. FIG. 4 is an explanatory diagram showing an image displayed on the display panel 108 and a user's operation. FIGS. 5 to 7 are explanatory diagrams showing a relationship between the display panel 108 and the user's finger.

Figure 8:
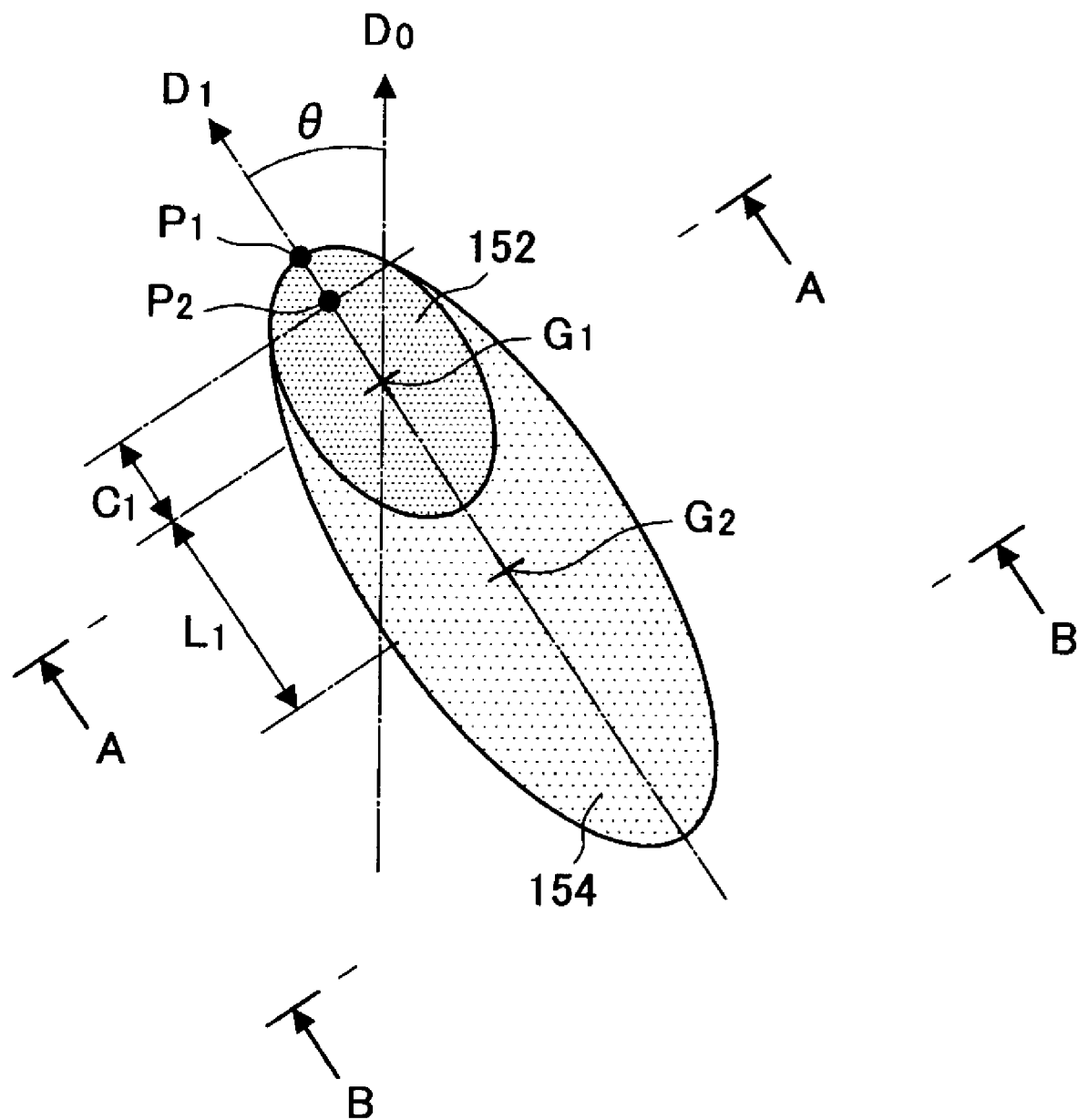
FIG. 8 is an explanatory diagram showing a region having a 3-value processed luminance value which is detected by a light reception sensor.

FIG. 8 is an explanatory diagram showing a region having a 3-value processed luminance value which is detected by the light reception sensor 120.

Figure 9A:
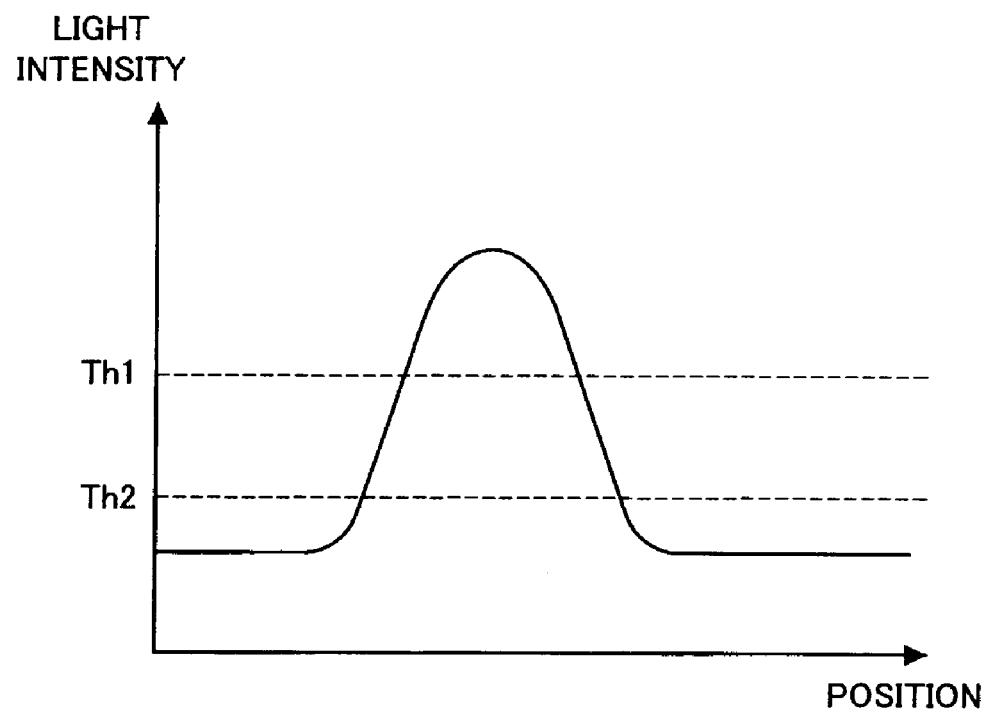
FIGS. 9A and 9B are graphs showing distributions of luminance values (light intensity).
Figure 9B:
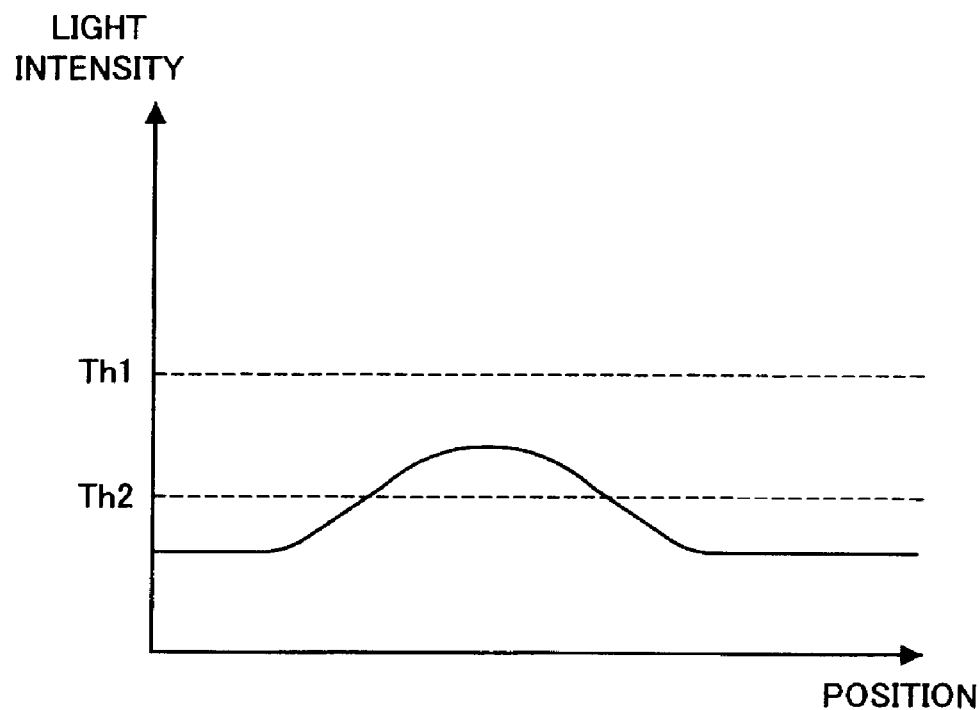

FIGS. 9A and 9B are graphs showing distributions of luminance values (light intensities). FIG. 9A shows a distribution of the luminance values on the line A-A and FIG. 9B shows a distribution of the luminance values on the line B-B.

At first, the information processing apparatus 100 displays various items such as images or menu screens on the display panel 108 as a user interface based on image data (step S101). In the example shown in FIG. 4, a software keyboard 140 is displayed on the display panel 108.

When the user makes the finger 10 or hand, or an operation object such as a stylus closer to the screen of the display panel 108 as shown in FIG. 4, the light reception processing unit 122 performs a light reception processing based on the light detected by the light reception sensor 120 (step S102). When the user points an operation object on the screen (such as each key button of the software keyboard 140), the finger 10 or hand, or one end of the stylus makes closer to the screen and the other end is away from the screen as compared with the one end as shown in FIG. 5. In the following, there will be described a case in which the tip of the finger 10 (fingertip) is closest to the screen and the other part of the fingers 10 is away from the screen.

Next, the control unit 102 calculates the luminance value of each pixel of the image signal generated in the light reception processing unit 122 and 3-value processes the luminance value. The 3-value processing sets two predetermined threshold values and summarizes the luminance values having various distributions as shown in FIGS. 9A and 9B into the three values depending on the threshold values. The threshold values can be set depending on various conditions.

When the user points the screen by his/her finger 10, the distribution of the luminance values as shown in FIG. 8 can be obtained. A region 152 has a strong luminance value and a region 154 has a middle luminance value. A region having a weak luminance value is the regions other than the region 152 and the region 154. The region 152 is where the operation object such as the tip of the finger 10 is closest to the screen, and the region 154 corresponds to the finger 10 away from the screen as compared with the tip of the finger 10.

When a luminance value beyond the strong threshold value is detected (step S103), the information processing apparatus 100 can determine that a user's operation has been made and the proximity to the screen has occurred. Subsequently, the information processing apparatus 100 detects the proximity at the weak threshold value (step S104). When the proximity at the weak threshold value is detected, it can be determined that the user points the screen by the finger 10 or the like in a predetermined direction.

Then, the proximity detection unit 161 calculates the respective centroid positions of the region 152 and the region 154. A first centroid $G_1$ shown in FIG. 8 is the centroid position of the region 152, and a second centroid $G_2$ is the centroid position of the region 154.

Next, the finger coordinate calculation unit 162 calculates the first centroid $G_1$ calculated by the proximity detection unit 161 as the contact position or proximity position based on the first centroid $G_1$ (step S105). The coordinate of the first centroid $G_1$ is a temporary representative point of the position at which the operation object contacts or is proximate to the surface of the display panel 108. However, the coordinate of the first centroid $G_1$ is different from the user-intended contact or proximity point in many cases. Thus, in the present embodiment, the corrected finger coordinate is calculated as follows to calculate the finger coordinate close to the user-intended contact or proximity point.

The angle calculation unit 163 calculates a direction of the straight line connecting the first centroid $G_1$ and the second centroid $G_2$ based on the centroids $G_1$ and $G_2$ (step S106). For example, the angle calculation unit 163 calculates an angle θ (see FIG. 8) of the straight line $D_1$ connecting the first centroid and the second centroid relative to the vertical direction $D_0$ in the screen. In the example shown in FIG. 6, the angle formed between the vertical direction $D_0$ in the screen and the straight line $D_1$ connecting the first centroid and the second centroid is $θ_1$. In the example shown in FIG. 7, the angle between the vertical direction $D_0$ in the screen and the straight line $D_1$ connecting the first centroid and the second centroid is $θ_2$. The straight line $D_1$ connecting the first centroid and the second centroid corresponds to the direction of the finger 10. Therefore, the direction in which the finger 10 points the display panel 108 can be numerically expressed (angle θ).

Furthermore, the offset amount calculation unit 164 calculates the amount of offset $C_1$ based on the distance $L_1$ between the first centroid $G_1$ and the second centroid $G_2$ calculated in the proximity detection unit 161 as shown in FIG. 8 (step S107).

Next, the corrected finger coordinate calculation unit 165 calculates a pointed position different from the contact position or proximity position based on the contact position or proximity position (first centroid $G_1$) calculated in the finger coordinate calculation unit 162, and the angle θ of the direction of the straight line connecting the first centroid $G_1$ and the second centroid $G_2$ (step S108). The pointed position different from the contact position or proximity position is a corrected finger coordinate. For example, the corrected finger coordinate calculation unit 165 calculates a position on the straight line to which the contact position or proximity position calculated in the finger coordinate calculation unit 162 is moved by the amount of offset $C_1$ as a pointed position $P_2$. The pointed position $P_2$ is closer to the user-intended contact or proximity position as compared with the contact or proximity position calculated from the first centroid $G_1$ or the like.

In step S107, the offset amount calculation unit 164 may calculate the distance between one end of the first region 152 at which the straight line $D_1$ connecting the first centroid $G_1$ and the second centroid $G_2$ crosses the boundary of the first region 152 and the first centroid $G_1$ as the amount of offset. At this time, in step S108, the corrected finger coordinate calculation unit 165 calculates a position on the straight line to which the contact position or proximity position calculated in the finger coordinate calculation unit 162 is moved by the amount of offset as a pointed position $P_1$ (see FIG. 8). The pointed position $P_1$ is closer to the user-intended contact or proximity position as compared with the contact or proximity position calculated from the first centroid $G_1$ or the like.

Finally, a display processing is performed on various displays displayed on the display panel 108 based on the corrected finger coordinate (step S109). For example, there will be described a case in which the software keyboard 140 is displayed in three stages as shown in FIG. 4. Even when the user intends to contact or make close to a key button at the upper stage, a contact or proximity to a key button at the middle stage may be detected. Further, when the distance between the buttons is short, erroneous detection may occur to right and left key buttons of the intended key button. According to the present embodiment, the angle θ formed by the finger 10 relative to the vertical direction $D_0$ in the screen can be seen. Thus, it is possible to calculate the corrected finger coordinate on the straight line corresponding to the direction of the finger 10 and to calculate the pointed position closer to the user-intended contact or proximity position. Consequently, in the example shown in FIG. 4, a key button at the middle stage is not selected and a key button at the upper stage is selected instead. Further, the right and left key buttons are not selected and the intended key button is selected.

In related art, the contact or proximity to the touch panel is detected as a region having a certain area on the touch panel. Thus, in order to calculate a representative point of the contact or proximity points on the touch panel, the centroid of the contact region or proximity region having a certain area was calculated and the calculated centroid position has been determined as the representative point of the contact or proximity points.

However, the point which has been determined to be contact or proximate to the touch panel based on the centroid of the region may be different from a user-intended contact or proximity point to the touch panel. For example, when the user-selectable buttons are adjacently displayed on the screen of the touch panel, a button different from the user-intended button may be selected due to how to hold the touch panel or a length of a user's nail.

On the other hand, according to the present embodiment, the pointed position close to the user-intended contact or proximity position can be calculated instead of the contact or proximity position detected between the user's finger 10 and the display panel 108. Consequently, user's discomfort can be reduced and erroneous operation such as tapping of an erroneous display button on the display panel 108 can be decreased.

The present application contains subject matter related to that disclosed in Japanese Priority Patent Application JP 2008-221856 filed in the Japan Patent Office on Aug. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, there has been described the case in which the proximity detection unit 161 calculates a luminance value as a proximity value for one example of the proximity value obtaining unit in the above embodiment, but the present invention is not limited to the example. For example, the proximity value obtaining unit is, for example, an electrostatic capacitance touch panel, which may include the electrostatic capacitance detection unit and the proximity value calculation unit. The electrostatic capacitance detection unit detects an electrostatic capacitance between a user's finger (operation object) and the surface of the display unit. The proximity value calculation unit calculates a change in the detected electrostatic capacitance as the proximity value. For example, it is possible to calculate whether a finger contacts the surface of the display unit or how much they are distant from each other depending on the change in the electrostatic capacitance. Then, similarly to the above embodiment, the proximity detection unit 161 of the control unit 102 3-value processes the proximity value based on the calculated proximity value and calculates the first region and the second region.

The proximity value obtaining unit may be a sensitive touch panel and may calculate a proximity value depending on a detected pressure. The proximity value is subjected to the 3-value processing depending on the degree of the pressure, thereby calculating the first region and the second region. For example, a contact direction of a finger can be known depending on the contact pressure of the user's finger on the screen.

The respective centroids of the calculated first region and second region are calculated in the present embodiment, but the present invention is not limited to the example. For example, the center of a line connecting one end of a region and the other end thereof may be employed other than the centroid if it is a representative value of the regions capable of calculating a direction connecting the two regions.

There has been described the software keyboard 140 as shown in FIG. 4 to be displayed on the display panel 108 for the display processing in the above embodiment, but the present invention is not limited to the example. For example, user-selectable displays such as various buttons, slider, text or browser link can be applied to other display.

What is claimed is:

1. An information processing apparatus, comprising:
   a proximity value obtaining unit that obtains a proximity value of a contact or a proximity between an operation object and a surface of a display unit;
   a region detection unit that 3-value processes the proximity value and detects a first region and a second region different from the first region depending on the 3-value processed proximity value;
   a centroid position calculation unit that calculates positions of respective centroids of the first region and the second region;
   a linear direction calculation unit that calculates a direction of a straight line connecting a first centroid as the centroid of the first region and a second centroid as the centroid of the second region;
   a position calculation unit that calculates a contact position or proximity position between the operation object and the surface of the display unit based on the proximity value;
   a pointed position calculation unit that calculates a pointed position different from the contact position or the proximity position based on the contact position or the proximity position and the direction of the straight line connecting the first centroid and the second centroid; and
   an offset amount calculation unit that calculates an amount of offset based on a distance between the first centroid and the second centroid, wherein:
      the position calculation unit calculates the first centroid as the contact position or the proximity position; and
      the pointed position calculation unit calculates the pointed position as a position on the straight line to which the contact position or the proximity position is moved by the amount of offset.

2. The information processing apparatus according to claim 1, wherein the proximity value obtaining unit comprises:
   a light reception unit that receives a light incident into the surface of the display unit from outside and converts the received light into an electric signal; and
   a luminance value calculation unit that calculates a luminance value for at least one pixel as the proximity value from the electric signal.

3. The information processing apparatus according to claim 1, wherein the proximity value obtaining unit comprises:
   an electrostatic capacitance detection unit that detects an electrostatic capacitance between the operation object and the surface of the display unit; and
   a proximity value calculation unit that calculates a change in the electrostatic capacitance as the proximity value.

4. The information processing apparatus of claim 1, wherein the display unit is configured to display an image on a screen based on image data.

5. An information processing method comprising the steps of:
   obtaining a proximity value of a contact or proximity between an operation object and a surface of a display unit by a proximity value obtaining unit;
   3-value processing the proximity value and detecting a first region and a second region different from the first region depending on the 3-value processed proximity value by a region detection unit;
   calculating positions of respective centroids of the first region and the second region by a centroid position calculation unit;
   calculating a direction of a straight line connecting a first centroid as the centroid of the first region and a second centroid as the centroid of the second region by a linear direction calculation unit;
   calculating a contact position or proximity position between the operation object and the surface of the display unit based on the proximity value by a position calculation unit;
   calculating a pointed position different from the contact position or the proximity position based on the contact position or the proximity position and the direction of the straight line connecting the first centroid and the second centroid by a pointed position calculation unit; and
   calculating an amount of offset based on a distance between the first centroid and the second centroid, wherein:

calculating the contact position or proximity position comprises calculating the first centroid as the contact position or the proximity position; and calculating the pointed position comprises calculating a position on the straight line to which the contact position or the proximity position is moved by the amount of offset.

6. The method of claim 5, further comprising displaying an image on a screen of the display unit based on image data.

7. The method of claim 5, further comprising:
converting light incident into the surface of the display unit from outside into an electric signal; and
calculating a luminance value for at least one pixel as the proximity value from the electric signal.

8. The method of claim 5, further comprising:
detecting an electrostatic capacitance between the operation object and the surface of the display unit; and
calculating the proximity value based on a change in the electrostatic capacitance.

9. A tangible, non-transitory computer-readable medium storing instructions that, when executed by a processor, cause the processor to perform a method, comprising:
obtaining a proximity value of a contact or proximity between an operation object and a surface of a display unit by a proximity value obtaining unit;
3-value processing the proximity value and detecting a first region and a second region different from the first region depending on the 3-value processed proximity value by a region detection unit;
calculating positions of respective centroids of the first region and the second region by a centroid position calculation unit;
calculating a direction of a straight line connecting a first centroid as the centroid of the first region and a second centroid as the centroid of the second region by a linear direction calculation unit;
calculating a contact position or proximity position between the operation object and the surface of the display unit based on the proximity value by a position calculation unit;
calculating a pointed position different from the contact position or the proximity position based on the contact position or the proximity position and the direction of the straight line connecting the first centroid and the second centroid by a pointed position calculation unit; and
calculating an amount of offset based on a distance between the first centroid and the second centroid, wherein:
calculating the contact position or proximity position comprises calculating the first centroid as the contact position or the proximity position; and
calculating the pointed position comprises calculating a position on the straight line to which the contact position or the proximity position is moved by the amount of offset.

10. The computer-readable medium of claim 9, wherein the method further comprises displaying an image on a screen of the display unit based on image data.

11. The computer-readable medium of claim 9, wherein the method further comprises:
converting light incident into the surface of the display unit from outside into an electric signal; and
calculating a luminance value for at least one pixel as the proximity value from the electric signal.

12. The computer-readable medium of claim 9, wherein the method further comprises:
detecting an electrostatic capacitance between the operation object and the surface of the display unit; and
calculating the proximity value based on a change in the electrostatic capacitance.

* * * * *